(12) United States Patent  
Flohr et al.

(10) Patent No.: US 7,253,721 B2
(45) Date of Patent: Aug. 7, 2007

(54) VEHICLE/IMPLEMENT COUPLING CONDITION MONITORING SYSTEM

(75) Inventors: Werner Flohr, Kaiserslautern (DE); Uwe Vollmar, Zweibrucken (DE); Patrick Metzler, St. Wendel (DE)

(73) Assignee: Deere & Company, Moline, IL (US)

( * ) Notice: Subject to any disclaimer, the term of this patent is extended or adjusted under 35 U.S.C. 154(b) by 202 days.

(21) Appl. No.: 11/082,285

(22) Filed: Mar. 17, 2005

(65) Prior Publication Data

US 2005/0212665 A1 Sep. 29, 2005

(30) Foreign Application Priority Data

Mar. 25, 2004 (DE) .................. 10 2004 014 497

(51) Int. Cl.
 *G08B 21/00* (2006.01)
(52) U.S. Cl. .............. 340/431; 280/504; 303/22.4; 340/687; 701/70; 701/101
(58) Field of Classification Search ........... 280/400, 280/504; 303/20, 22.1, 22.4; 414/563, 462; 340/431, 687; 701/51, 70, 67, 101
See application file for complete search history.

(56) References Cited

U.S. PATENT DOCUMENTS 5,069,472 A  12/1991  Parr et al. ............... 280/433
5,421,600 A   6/1995  Jones et al. ............. 280/428
5,678,664 A * 10/1997  Marasco ................ 188/112 R
5,861,802 A   1/1999  Hungerink et al. ........ 340/431
6,685,281 B2 * 2/2004  MacGregor et al. ......... 303/20

FOREIGN PATENT DOCUMENTS

| DE | 508361 | 9/1930 |
|---|---|---|
| DE | 4412111 | 10/1995 |
| DE | 196 47 042 | 5/1997 |
| DE | 101 04 180 | 7/2002 |
| DE | 101 35 272 | 1/2003 |
| GB | 2 381 915 | 5/2003 |
| WO | WO 03/020561 | 3/2003 |

\* cited by examiner

Primary Examiner—Thomas Mullen

(57) ABSTRACT

An engine-driven vehicle/implement coupling system includes a mechanical coupling and one or more electronic and/or hydraulic connections. A coupling condition monitoring system includes one or two electronic control units, sensors for sensing a coupling condition of the electronic and/or hydraulic connection, and a sensor on the mechanical coupling for generating a signal representing a coupling condition of the mechanical coupling. Sensor signals are transmitted to the electronic control unit which, in response prevents erroneous coupling or uncoupling and prevents drive-away of the vehicle or implement.

12 Claims, 1 Drawing Sheet

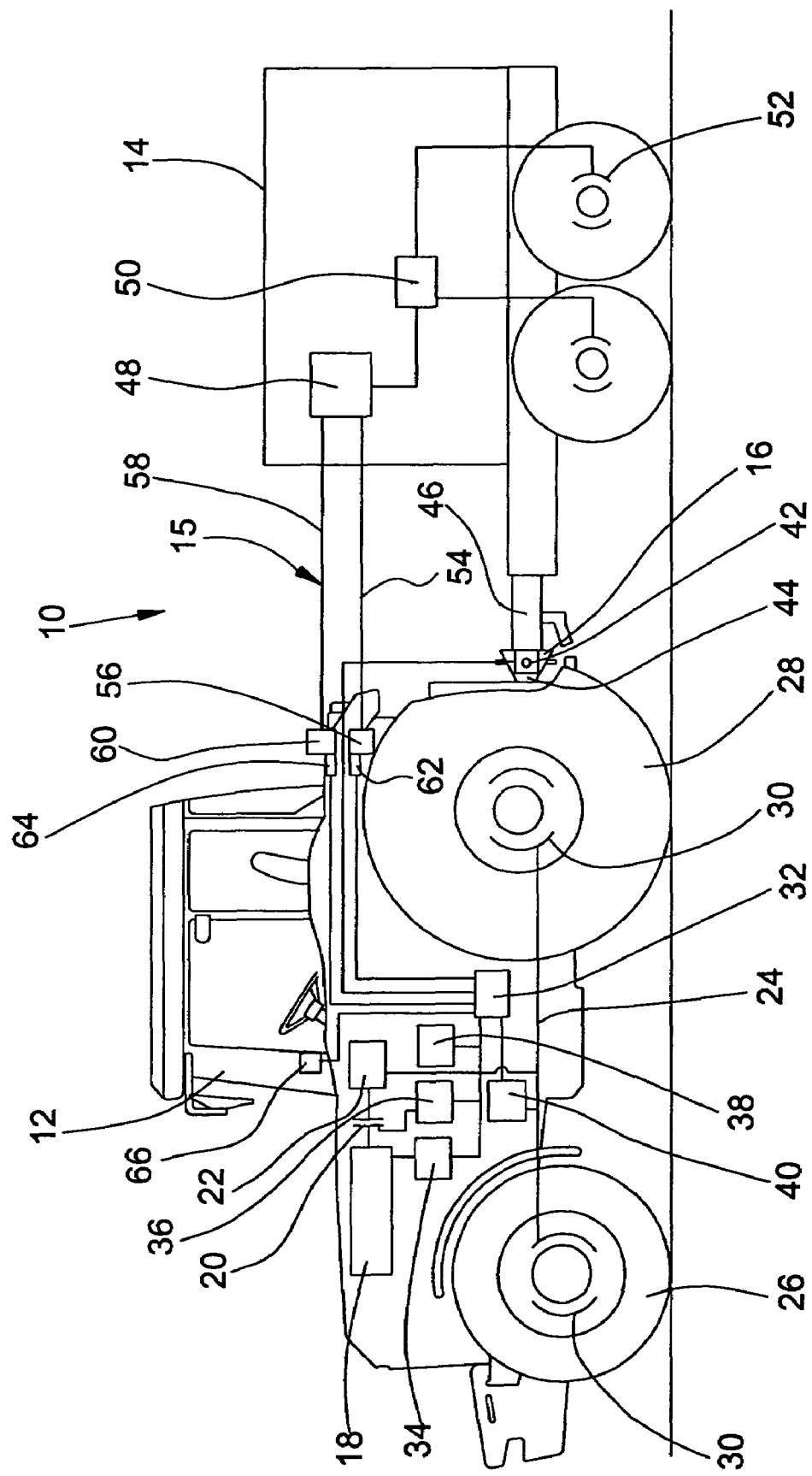

VEHICLE/IMPLEMENT COUPLING CONDITION MONITORING SYSTEM

BACKGROUND

The present invention relates to a coupling condition monitoring system for monitoring a coupling condition of an engine-driven towing vehicle coupled to an implement.

Various control systems are known for monitoring the condition of a coupling system which couples an implement to a towing vehicle. Such control systems are intended to avoid erroneous operation of coupling attachments that could damage the towing vehicle and/or the implement or even cause injury. Moreover, such control systems help assure an orderly electrical and/or mechanical operation of a coupled towing vehicle/implement. The implement may be a trailer or an agricultural implement.

A system for monitoring a trailer/towing vehicle mechanical coupling is disclosed in DE 196 47 042 A1, wherein a sensor transmits an error signal which causes a blinking light when the towing vehicle is improperly coupled to the implement.

DE 101 35 272 A1 describes a monitoring circuit which senses an error in the connection of a retraction or extension of a coupling element, and prevents any further retraction or extension. A similar system is disclosed by DE 101 04 180 A1 which detects the use of an electric supply and blocks the automatic actuation of an attachment coupling.

DE 44 12 111 A1 discloses an attached coupling system that assures an automatic connection of mechanical as well as electrical couplers.

These known control systems described above monitor the process of coupling an implement to the towing vehicle, but they do not monitor the uncoupling process. However, modern towing vehicles and implements are equipped with costly coupling systems that include electrical and/or hydraulic and/or pneumatic connecting lines, and, in particular, connecting lines for CAN-bus systems. These coupling systems can be damaged by inappropriate uncoupling processes or erroneous operation of the coupling system. For example, an operator could fail to separate the electronic and/or hydraulic and/or pneumatic connecting lines after the mechanical uncoupling of the coupled implement. Also, during operation on a slope the towing vehicle and the implement could move away from each other before the completion of the uncoupling process. An unintended separation of the towing vehicle from the implement after a mechanical uncoupling, but while the electrical, hydraulic and/or pneumatic connections are still intact, can result in damage to the connections and significant repair costs.

Frequently, plug-in connections are designed so that they separate automatically at a certain maximum force. But this may not occur in all operating conditions. If a towing vehicle is separated from a trailer at a significant angle to the trailer, then the plug-in connections may not separate without damage. Other connections cannot be separated without damage.

It would be desirable to have a vehicle/implement coupling system which prevents unintended separation of the vehicle from the implement, as long as a coupling or uncoupling process is not fully completed.

SUMMARY

Accordingly, an object of this invention is to provide a system which prevents unintended separation of a vehicle from an implement, as long as a coupling or uncoupling process is not fully completed.

These and other objects are achieved by the present invention, wherein an engine-driven vehicle/implement coupling system includes a mechanical coupling and one or more electronic and/or hydraulic connections. A coupling condition monitoring system includes one or two electronic control units, sensors for sensing a coupling condition of the electronic and/or hydraulic connection, and a sensor on the mechanical coupling for generating a signal representing a coupling condition of the mechanical coupling. Sensor signals are transmitted to the electronic control unit which, in response prevents erroneous coupling or uncoupling and prevents drive-away of the vehicle or implement.

This system prevents an improper uncoupling of the coupled implement, and prevents removal of the towing vehicle from the implement without the connecting lines being uncoupled. This can also help avoid an improper coupling, such as, for example, when the connecting lines are not closed after the mechanical coupling of the coupled implement. Preferably, the coupling system includes a mechanical attachment apparatus configured as a simple towbar or as a three-point coupling system as is usual for agricultural towing vehicles. A combination system can permit a simple pendulous towbar as well as a three-point attachment coupling.

Preferably, the connecting line includes an electronic, hydraulic and/or a pneumatic connecting line. An electronic connecting line can connect electronic components and data transfer between electronic components. Moreover, hydraulic and/or pneumatic systems on the coupled implement can be supplied by means of hydraulic and/or pneumatic connecting lines.

Preferably, a first electronic control unit is arranged on the towing vehicle and a second electronic control unit is arranged on the implement, and these are connected to each other by the electronic connection. Thus, the two control units can communicate with each other, and processes or procedures specific to the implement are controlled by the control unit on the towing vehicle. It is also possible to influence parameters provided as input to the coupled implement so as to affect the electronic control unit and other control modules, such as, for example, gearbox controls, brake system controls, engine controls, etc.

In the case of a CAN-bus system, the electronic connections can be interrogated directly and a flow of signals between the electronic control units can be detected. In this case special sensor technology to monitor a connection condition can be omitted.

In a preferred embodiment, the sensor for monitoring the mechanical coupling is an optical sensor, a magnetic induction sensor, an ultra sound sensor, a short circuit sensor, a touch sensor, a contact sensor, a pressure sensor or a switch of a mechanical, pneumatic or hydraulic type. Other sensors may also be applied that can detect a mechanical contact in any way whatever between two coupling elements.

Such sensors can also monitor the connection conditions of the hydraulic, electronic and/or pneumatic connecting lines. In that way sensors can detect the electronic and/or hydraulic connection conditions using magnetic-induction, optical, ultrasonic, tactile, pressure sensitive or similar methods. Mechanical switches are also conceivable here that are actuated automatically upon the establishment of a connection between two components and transmit a signal to the electronic control unit.

In a further preferred embodiment, a drive-away prevention system is actuated by the electronic control unit. The drive-away prevention system can be actuated by the electronic control unit on the towing vehicle or by the electronic control unit on the implement.

The drive-away prevention system can prevent the towing vehicle from driving away. The moving away of the implement can also be prevented, such as in the case of operation on a slope. For example, a brake system of the towing vehicle can be activated and another brake system on the coupled implement can also be activated. Activation of the brake system is beneficial since the implement may be frequently coupled to the towing vehicle while the engine of the towing vehicle is running, since, for example, a power take-off shaft or a hydraulic system must continue in operation. In such a situation stopping the engine to prevent drive-away is a disadvantage. Nevertheless, in other situations the operation of a power take-off shaft or a hydraulic system could be omitted, so that stopping the drive engine as drive-away prevention could be an option. Other alternative drive-away prevention possibilities can be attained by uncoupling the drive engine from a drive-line or by shifting the gearbox into an idle gear ratio. Other alternative solutions are also conceivable for the drive-away prevention that prevent the towing vehicle from driving away regardless of the operating condition of the drive engine.

Preferably, a deactivating device is provided on the vehicle for deactivating the connection condition monitoring system. This is advantageous if, for example, sensors are provided for monitoring the hydraulic connection line on the towing vehicle, but the coupled implement does not have any hydraulic functions. This permits deactivation of drive-away prevention even if no signal can be generated to disable drive-away prevention function.

BRIEF DESCRIPTION OF THE DRAWINGS

The sole FIGURE is a schematic side view of a towing vehicle/implement coupling system according to the invention.

DETAILED DESCRIPTION

A vehicle/implement combination 10 includes a towing vehicle 12 and an implement 14 coupled to the vehicle 12 by a coupling system 15. The coupling system 15 includes a mechanical coupling 16 which mechanically couples the implement 14 to the vehicle 12. The coupling 16 is a simple pendulous towbar, but the coupling 16 may also be a three-point hitch or a combination of a three-point hitch with a pendulous towbar. Alternatively, the coupling 16 could be a ball joint coupling.

The towing vehicle 12 is an agricultural tractor, but the invention applies to other types of towing vehicles 12. The towing vehicle 12 includes a drive engine 18 coupled to a gearbox 22 by a clutch 20. The gearbox 22 is connected by a drive-line 24 to drive axles (not shown). The drive axles are connected with wheels 26, 28. The vehicle also has a brake system 30 for braking the wheels 26, 28.

The towing vehicle 12 has an electronic control unit 32 which is connected with an engine control 34, a clutch control 36, a gearbox control 38 and a brake system control 40.

The coupling 16 couples a vehicle coupling element 44 with an implement coupling element 46. Coupling 16 includes a sensor 42 that monitors mechanical coupling elements 44, 46 and issues signals or monitors a mechanical contact of coupling element 44 with coupling element 46. The sensor 42 monitoring at the usual mechanical attachment points, such as at the coupling elements 44, 46, or at the attachment points of a three-point hitch (not shown). The sensor 42 may be a touch sensor that delivers an electrical signal as soon as a mechanical contact between two elements has been established. Or, sensor 42 may be a magnetic-induction or optical sensor, or a push-button switch that generates an electronic signal.

The implement 14 is equipped with a further electronic control unit 48 which is connected with a brake system control 50 for controlling the actuation of a brake system 52 of the implement 14.

A hydraulic connecting line 54 and a hydraulic connector 56 connects a hydraulic device (not shown) on the implement 14 to a hydraulic system (not shown) on the vehicle 12. The hydraulic connecting line 54 can be equipped with a connector on the coupled implement 14 and/or on the vehicle 12. Additional hydraulic connecting lines can also be provided with several hydraulic connectors.

In place of hydraulic connecting lines 54, pneumatic supply lines (not shown) could also be provided for the supply of a pneumatic unit (not shown) on the implement 14.

An electronic connecting line 58 is provided between the vehicle 12 and the implement 14 for the electrical supply and/or the electronic control of the implement 14. The connecting line 58 is connected to an electronic connector 60 on the vehicle 12 and/or on the implement 14. Preferably, the connecting line 58 is a CAN-bus type connecting line and the connector 60 is a CAN-bus capable plug-in connector in the form of a "ISO 11783 Break-away Connector".

A connection between the towing vehicle 12 and the coupled implement 14 or between the electronic control unit 32 and the electronic control unit 48 is established over the electronic connecting line 58. Additional electronic connecting lines (not shown) may be provided with several electronic connectors on the vehicle 12 and/or on the implement 14.

In order to be able to determine the condition of the connection between the vehicle 12 and the implement 14, the connectors 56, 60 include sensors 62, 64 which deliver signals to the electronic control units 32, 48, but preferably deliver a signal to the electronic control unit 32 of the vehicle 12. As soon as a separation of a connecting line 54, 58 from a connector 56, 60 occurs, this can be registered by the control unit 32, 48. The same can occur if a connection of the connecting lines 54, 58 with the connectors 56, 60 occurs. A signal may be generated by the separation as well as by the connection of these components.

Alternatively, the sensor 62 can be positioned to one side of the connector 56. A hydraulic or pneumatic system pressure or system flow can then be detected at another location within the hydraulic and/or pneumatic system. As long as a predetermined system pressure or system flow exists or is detected, a corresponding signal can then be generated. Preferably, then a corresponding system pressure or system flow can also be drained off or built up when the connector 56 is connected or disconnected.

Alternatively, sensor 64 can be omitted at the electronic connector 60, if a CAN-bus system is used. Since a continuous data flow is registered when a CAN-bus system is used, the electronic control unit 32, 48 can also recognize a connection condition (connected or separated plug-in connection) without the sensor 64. Thereby the electronic connector 60 can be monitored by means of sensor 64 or by the CAN-bus system. The electronic connector 60 may be an ISO "11783 break-away connector".

When a CAN-bus system is used, it performs a status inquiry or "polls", for example, the electronic control unit 32 of a CAN-bus network for all possible CAN-addresses of all possible implements 14. If the control unit 32 recognizes an electronic control unit 48 (implement controller) on the implement 14, this indicates that the plug-in connector is plugged in or connected. Other signal monitoring systems of the plug-in connection are possible and can supplement the address polling or even replace it. The monitoring can also be performed from the implement 14 or from the electronic control unit 48 of the implement 14.

Regardless of whether the connection condition of the connector 60 is recognized by the sensor 64 or by a CAN-bus system, the electronic control unit 32, 48, which may be connected with a CAN-bus system if necessary, is notified simultaneously by means of the sensor 42 of the presence or absence of a mechanical connection at the coupling elements 44, 46. In case hydraulic connecting lines 54 are applied, a signal is also transmitted from the sensor 62 to the electronic control unit 32, 48.

A logical relationship is established from the signals transmitted in order to protect the plug-in connection or the connectors 56, 60, the connecting lines 54, 58, the vehicle 12, the implement 14, or components connected to the vehicle 12 and the implement 14, such as cable strands, connecting plugs, small electronic components, sheathing components, and other components. If the implement 14 is not recognized by the sensor 42, such as if the attachment coupling 16 is separated or released, and simultaneously the electronic connector 60 or the hydraulic or pneumatic connector 56 is recognized as connected, then a separation of the vehicle 12 from the implement 14 is not permitted, and a drive-away prevention function is performed. If the vehicle 12 is separated from the implement 14, plug-in connections can be destroyed and the vehicle 12, the implement 14 and/or other components can be damaged. A drive-away prevention function is performed by activating the brake systems 30, 52 by actuating the brake system control 40, 50 by the electronic control unit 32, 48. The system can actuate the brake system 30 of the vehicle 12 as well as the brake system 52 of the implement 14. It is also possible to actuate only the brake system 30 of the vehicle 12. Drive-away prevention may also be performed by the engine control 34 interrupting the ignition process or the injection process for the engine 18, by the clutch control 36 disengaging the drive clutch 20, or even by the gearbox control 38 shifting the gearbox 22 into an idle gear ratio or park position.

The invention prevents an erroneous uncoupling of the implement 14 from the vehicle 12, in order to avoid any possible follow-on damage to the electrical and/or hydraulic connecting lines or to the components on the vehicle 12 or the implement 14. Similarly, the invention can also be used to avoid an erroneous attaching coupling. Then, for example, a signal generated by the sensor 42 is utilized to prevent a drive-away situation. Then drive-away prevention is deactivated only after the electronic and/or hydraulic connecting line 54, 58 has been connected or when the sensors 62, 64 issue a signal for the disabling of drive-away prevention. This helps avoid the operation of the vehicle 12 or the implement 14 when there is no electronic or hydraulic supply to the implement 14.

The invention includes a deactivation switch 66 which is connected to the electronic control unit 32, and which is operable to deactivate one or more sensors 62, 64 on the vehicle 12 when an implement 14 is to be used without hydraulic connections, in order to deactivate or disable the drive-away prevention function, despite the absence of a connection condition monitoring signal.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A coupling condition monitoring system for monitoring a coupling condition of a vehicle/implement coupling system having a mechanical vehicle/implement coupler and a connecting line for connecting between the vehicle and the implement, the monitoring system comprising:
   an electronic control unit;
   a connecting line connection condition detector; and
   a sensor on the mechanical coupler, the sensor generating a signal indicative of a coupling condition of the mechanical vehicle/implement coupler and transmitting said signal to the electronic control unit, the control unit, in response to said signal and in response to a signal from the connecting line connection condition detector, preventing the vehicle and implement from being driven away.

2. The coupling condition monitoring system of claim 1, wherein:
   the connecting line comprises an electronic connecting line.

3. The coupling condition monitoring system of claim 2, characterized by:
   a further electronic control unit, one of the control units being arranged on the vehicle and the other control unit being arranged on the implement, and the control units are connected to each other by the electronic connecting line.

4. The coupling condition monitoring system of claim 3, wherein:
   the connecting line comprises a CAN-bus system which transmits signals between the electronic control units, and the CAN-bus system being operable to detect the connection condition of the electronic connecting line.

5. The coupling condition monitoring system of claim 1, wherein:
   the connecting line comprises a hydraulic connecting line.

6. The coupling condition monitoring system of claim 1, wherein:
   the connecting line comprises a pneumatic connecting line.

7. The coupling condition monitoring system of claim 1, wherein:
   the electronic control unit operates to prevent the vehicle from being driven away.

8. The coupling condition monitoring system of claim 1, wherein:
   the electronic control unit operates to prevent the vehicle from being driven away by activating a brake system.

9. The coupling condition monitoring system of claim 1, wherein:
   the electronic control unit operates to prevent the vehicle from being driven away by stopping an engine of the vehicle.

10. The coupling condition monitoring system of claim 1, wherein:
    the electronic control unit operates to prevent the vehicle from being driven away by uncoupling engine of the vehicle from a drive-line.

11. The coupling condition monitoring system of claim 1, wherein:
    the electronic control unit operates to prevent the vehicle from being driven away independently of an operating condition of an engine of the vehicle.

12. The coupling condition monitoring system of claim 1, further comprising:
    a deactivation device on the vehicle and operable to deactivate monitoring of the connection condition.

* * * * *